United States Patent
Hageman

[11] Patent Number: 5,392,481
[45] Date of Patent: Feb. 28, 1995

[54] RETURN-TO-DOCK-LEVEL MECHANISM FOR A DOCKBOARD HAVING A HYDRAULIC HOLDDOWN

[75] Inventor: Martin P. Hageman, Mequon, Wis.

[73] Assignee: Kelley Company, Inc., Milwaukee, Wis.

[21] Appl. No.: 728,260

[22] Filed: Jul. 11, 1991

[51] Int. Cl.⁶ .................................................. E01D 1/00
[52] U.S. Cl. ......................................................... 14/71.1
[58] Field of Search .................... 14/71.7, 69.5–71.7; 104/31

[56] References Cited

U.S. PATENT DOCUMENTS

| | | | |
|---|---|---|---|
| 3,170,179 | 2/1965 | Layne | 14/71 |
| 3,201,814 | 8/1965 | LeClear | 14/71 |
| 3,271,801 | 9/1966 | Dieter et al. | |
| 3,699,601 | 10/1972 | Hecker, Jr. et al. | 14/71 |
| 3,967,337 | 7/1976 | Artzberger | 14/71.7 |
| 3,997,932 | 12/1976 | Artzberger | 14/71.3 |
| 4,257,136 | 3/1981 | Loblick | 14/71.3 |
| 4,398,315 | 8/1983 | Driear et al. | 14/71.3 |
| 4,727,613 | 3/1988 | Alten | 14/71.3 |
| 4,920,598 | 5/1990 | Hahn | 14/71.3 |
| 4,922,568 | 5/1990 | Hageman | 14/71.3 |

Primary Examiner—Stephen C. Pellegrino
Assistant Examiner—Nancy Mulcare
Attorney, Agent, or Firm—Andrus, Sceales, Starke & Sawall

[57] ABSTRACT

A dockboard includes a ramp which is hinged at its rear edge to a loading dock and a lip is hinged to the front edge of the ramp and can be pivoted from a downwardly hanging pendant position to an extended position generally flush with the ramp surface. The ramp is moved from a horizontal position to an upwardly inclined position by a counterbalancing spring assembly and a hydraulic holddown prevents upward movement of the ramp unless manually released. A return-to-dock-level mechanism includes a link that is pivotally connected to the underside of the ramp and an arm interconnects the link with the lip. If the ramp is at a below-dock-level position when a truck pulls away from the dock after loading operation is completed, the lip will fall to its pendant position and the downward movement of the lip is transmitted through the link and arm to pivot the arm into engagement with the release lever of the holddown, thereby releasing the holddown to enable the ramp to be elevated through the counterbalancing spring assembly. As the ramp is elevated to dock-level, the link rides out of contact with the release lever causing the holddown to be re-engaged and prevent further upward movement of the ramp.

12 Claims, 2 Drawing Sheets

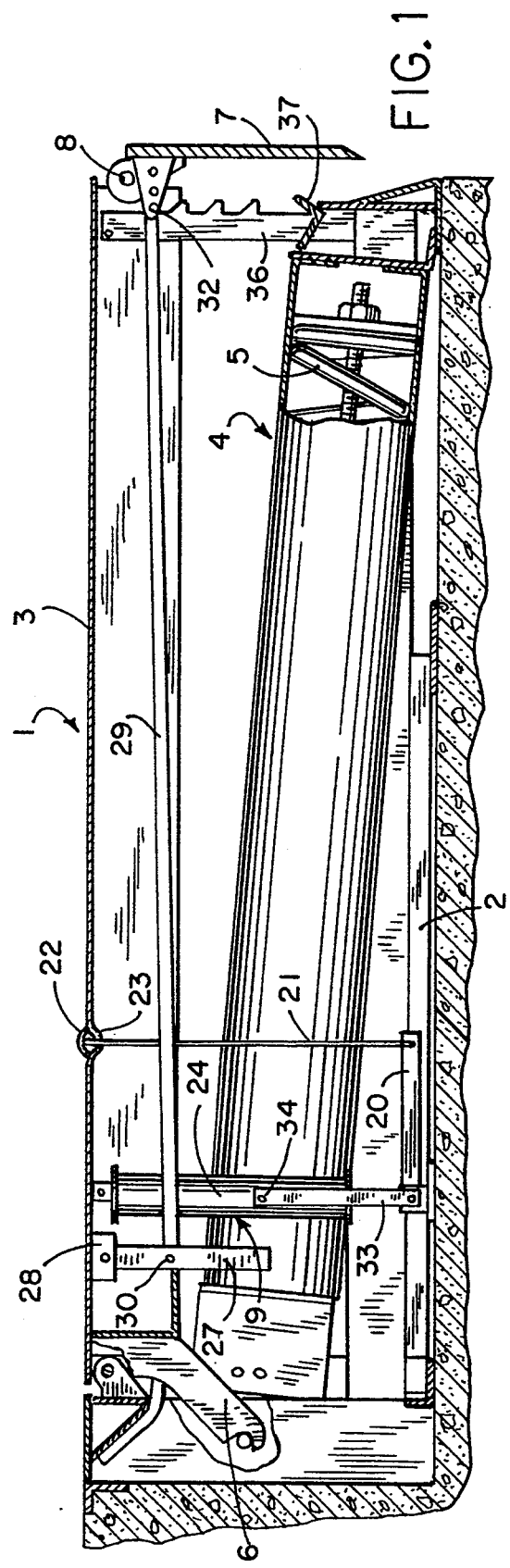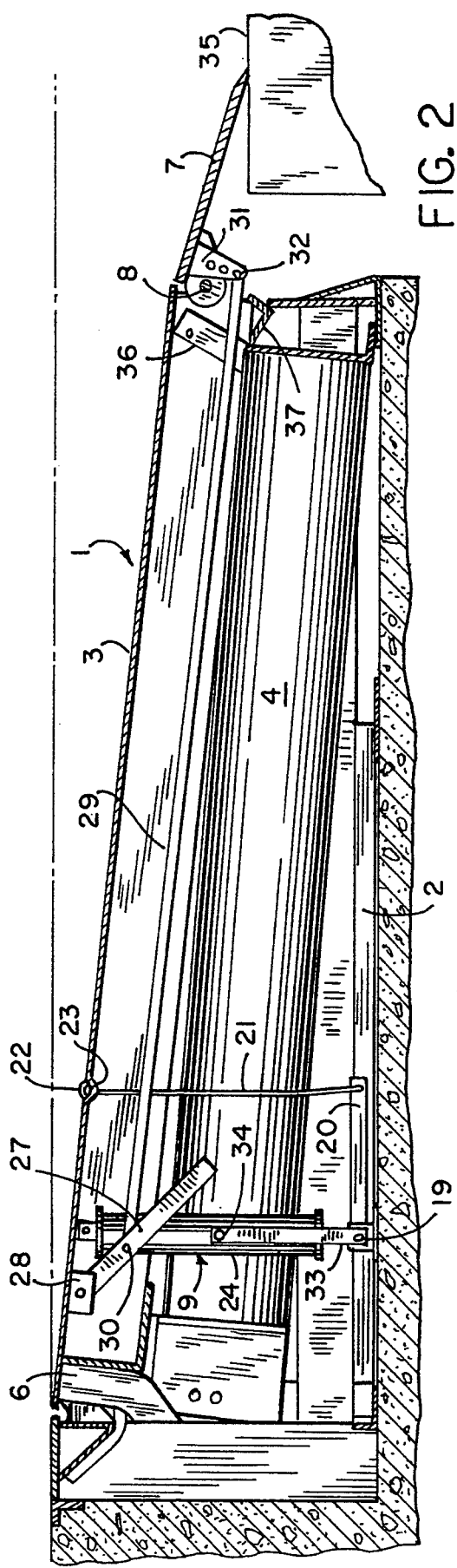

FIG. 3
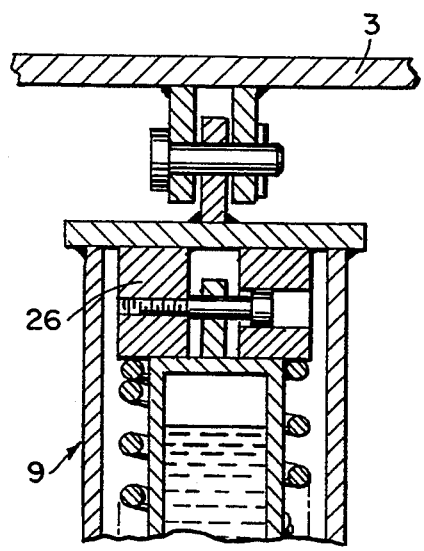
FIG. 4
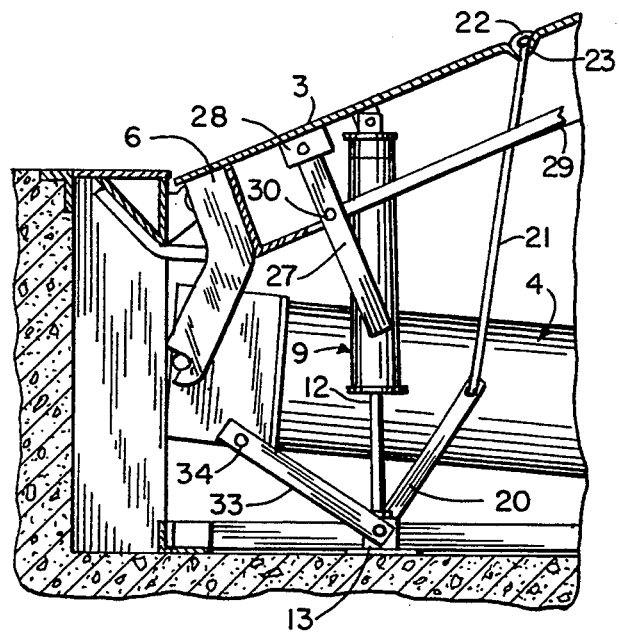
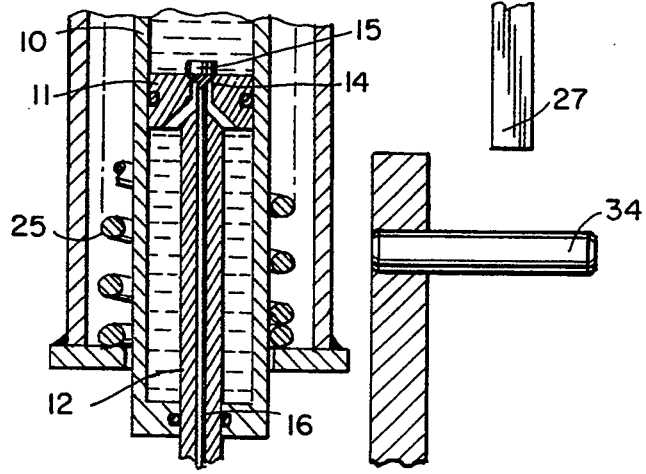
FIG. 5
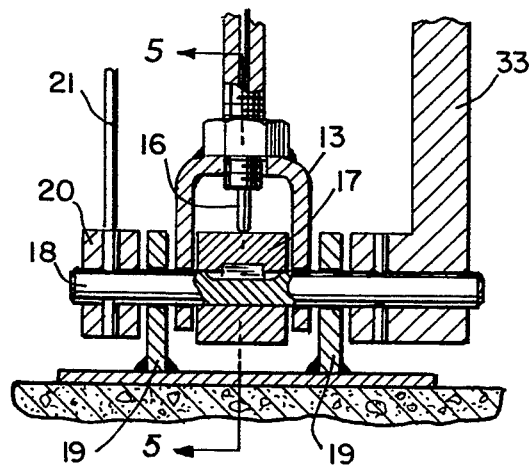
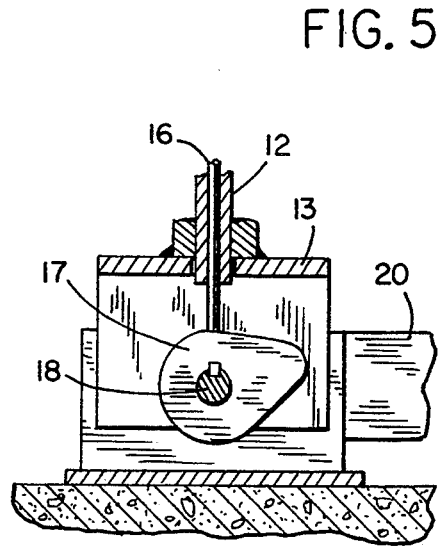

RETURN-TO-DOCK-LEVEL MECHANISM FOR A DOCKBOARD HAVING A HYDRAULIC HOLDDOWN

BACKGROUND OF THE INVENTION

A conventional dockboard, which is employed to bridge the gap between a loading dock and the bed of a truck or carrier, includes a ramp having its rear end hinged to the dock. The ramp is biased upwardly to an inclined position by a counterbalancing mechanism and a manually releasable holddown device holds the ramp against elevation. Hinged to the front edge of the ramp is an extension lip which is adapted to swing from a pendant position, in which the lip hangs downwardly, to an elevated position, in which the lip forms an extension to the ramp. The lip, when in the extended position, is adapted to engage the bed of a truck to bridge the gap between the ramp and the truck to enable material handling equipment to move between the dock and the truck bed.

U.S. Pat. No. 4,922,568 describes a hydraulic holddown mechanism that includes a cylinder connected to the ramp, and a piston is slidable in the cylinder and carries a piston rod that is connected to the frame of the dockboard. The piston is provided with a longitudinal passage which is closed off by a valve member and an actuating rod connected to valve member extends outwardly of the cylinder. Movement of the actuating rod will open the valve to permit extension of the piston rod with respect to the cylinder to enable the ramp to be pivoted upwardly by the counterbalancing spring assembly.

If the ramp is at a below-dock-level position when the truck pulls away from the dock, the ramp will remain at this downwardly inclined position unless the holddown mechanism is manually released to enable the counterbalancing spring assembly to raise the ramp. With the ramp elevated, the operator will then walk outwardly on the ramp, and the weight of the operator in combination with the weight of the ramp will lower the ramp until it returns to its horizontal cross traffic position.

It has been found that occasionally the operator may not carry out this procedure to return the ramp to dock-level position, with the result that the ramp remains in the downwardly inclined position. With the ramp in this below-dock-level position, it can provide an obstruction to material handling equipment moving over the dock.

U.S. Pat. Nos. 3,699,601 and 3,967,337 describe mechanisms which will automatically return the ramp to a dock-level position if the ramp is at a below-dock-level position when the truck pulls away from the dock. In these patents, a mechanism is employed which acts to release the holddown mechanism as the lip pivots downwardly from the extended position toward the pendant position. Release of the holddown mechanism enables the counterbalancing spring assembly to pivot the ramp upwardly to the dock-level position.

SUMMARY OF THE INVENTION

The invention is directed to an improved return-to dock-level mechanism for a dockboard utilizing a hydraulic holddown. The dockboard includes a ramp hinged at its rear edge to the loading dock, and a lip is hinged to the front edge of the ramp and is movable between a downwardly hanging pendant position, and an outwardly extending position where the lip forms an extension to the ramp.

The ramp is counterbalanced or biased to an upwardly inclined position by a counterbalancing spring assembly and a unidirectional releasable hydraulic holddown mechanism serves to prevent upward movement of the ramp while permitting free downward movement of the ramp.

The return-dock-level mechanism of the invention includes a rigid arm having one end pivotally connected to the underside of the lip, while the opposite end of the arm is pivotally connected to a link that is pivoted to the underside of the ramp. The link is constructed and arranged such that when the ram is in the horizontal or cross traffic position and the lip is pendant, the lower or distal end of the link will be located above an abutment on the release lever of the holddown mechanism.

After a truck or other carrier has backed up to the loading dock, the release lever of the hydraulic holddown is manually actuated by the dock operator to release the holddown and enable the ramp to pivot upwardly to the upper inclined position under the influence of the counterbalancing spring. The operator then walks outwardly on the ramp and the combined weight of the operator, along with the weight of the ramp, will overcome the biasing effect of the spring to cause the ramp to move downwardly toward the horizontal position. As the ramp pivots downwardly, the lip is pivoted outwardly to the extended position by a conventional lip lifting and latching mechanism. As the lip pivots outwardly, the link will be pivoted forwardly Continued downward movement of the ramp will cause the extended lip to engage the truck bed. If the truck bed is at a level beneath the level of the dock, the distal end of the link will be located forwardly and below the level of the abutment on the release level of the holddown.

After the loading operation has been completed and the truck pulls away from the dock, the lip will fall by gravity from the extended to the pendant position, and the downward pivotal movement of the lip will move the distal end of the link upwardly and rearwardly to engage the abutment on the holddown release lever to thereby move the lever to the disengaged position and enabling the counterbalancing spring to move the ramp upwardly. The link is constructed such that upward movement of the ramp to a position slightly above horizontal will cause the distal end of the link to ride out of engagement with the holddown release lever, thereby enabling the release lever to return to the engaged position and engage the holddown to prevent further upward movement of the ramp. The operator can then walk outwardly on the ramp to move the ramp slightly downward to the horizontal position where the cross traffic legs on the ramp will engage the frame to maintain the ramp in a horizontal position.

The mechanism of the invention will automatically return the dockboard to a dock-level position when the lip pivots downwardly and the ramp is at a below-dock-level position. This ensures that the ramp will be at the horizontal cross traffic position after the loading operation is completed and eliminates interference with cross traffic movement on the dock by virtue of the ramp being at a below-dock-level position. The return-to-dock level mechanism of the invention is of simple and inexpensive construction and can be readily retrofitted to existing dockboards with minimum reconstruction.

The invention provides a smooth return to dock level action and the mechanism can be readily adjusted by changing the location of the pivotal connection between the arm and the lip lug, or by changing the length of the link.

The mechanism enables end loads to be handled without hindering normal operation and without the necessity of disengaging of any components. End loads refer to loads or cargo which are located at the rear end of the truck bed and prevent the lip from being extended onto the truck bed until the loads are removed.

Other objects and advantages will appear in the course of the following description.

DESCRIPTION OF THE DRAWINGS

The drawings illustrate the best mode presently contemplated of carrying out the invention.

In the drawings:

FIG. 1 is a side elevation of a dockboard incorporating the return-to-dock-level mechanism of the invention, with the ramp in the horizontal cross traffic position;

FIG. 2 is a view similar to FIG. 1, showing the ramp in a below-dock-level position, with the lip engaged with a truck bed;

FIG. 3 is a longitudinal section of the hydraulic holddown mechanism;

FIG. 4 is a fragmentary longitudinal section of the dockboard, with the ramp shown in the upwardly inclined position and the lip pendant; and FIG. 5 is a section taken along line 5—5 of FIG. 3.

DESCRIPTION OF THE ILLUSTRATED EMBODIMENT

The drawings illustrated a dockboard 1 which is mounted in a pit or depression in a loading dock. The dockboard includes a frame 2 or supporting structure, and a ramp or deck plate 3 is hinged at its rear edge to the frame. The ramp is biased to an upwardly inclined position by a counterbalancing spring assembly 4, such as that disclosed in U.S. Pat. No. 3,528,118. The spring assembly, as shown in FIG. 1, includes a coil spring 5 having its rear end connected to a lever arm 6 that is secured to the rear edge of the ramp, and the force of the spring acts to move the lever arm forwardly to thereby urge the ramp to the upwardly inclined position, as shown in FIG. 4.

Hinged to the forward edge of the ramp is an extension lip 7. The lip 7 and ramp 3 carry aligned hinge tubes which receive a hinge pin 8. With this hinge connection, the lip can be pivoted from a downwardly hanging pendant position, as shown in FIG. 1, to an extended position, as shown in FIG. 2, in which the lip forms an extension to the ramp. Engagement of the rear edge of the lip with the forward surface of the ramp prevents the lip from moving beyond the extended position in which it is generally flush with the ramp.

The lip 7 is adapted to be moved from the pendant position to the extended position and latched in that position by a lip lifting and latching mechanism, not shown, which can be similar to that described in U.S. Pat. No. 3,967,337.

Ramp 3 can be held in any desired position by means of a hydraulic holddown mechanism 9 which can be similar to that described in U.S. Pat. No. 4,922,568, and the construction of that patent is incorporated herein by reference. The holddown mechanism 9 permits free downward movement of the ramp but prevents upward movement of the ramp under the influence of counterbalancing spring 5 unless the holddown is released. In general, the holddown mechanism 9 includes a cylinder 10 and a piston 11 is mounted for sliding movement in cylinder 10. Piston 11 carries a piston rod 12, which extends outwardly through the lower end of the cylinder, and is attached to a yoke 13.

As seen in FIG. 3, the piston 11 has a central opening which defines a valve seat 14, which is adapted to be closed by a valve 15. Valve 15 is carried by an actuating rod 16, which extends through an axial passage in the piston rod, and the lower end of rod 16 projects outwardly beyond the lower end of the piston rod and is engaged with the outer surface of a cam 17 that is secured to shaft 18. As shown in FIG. 3, shaft 18 is mounted for rotation within aligned openings in yoke 13 and in base members 19. A lever 20 is secured to one end of the shaft and an actuating cable 21 is connected to the outer end of lever 20, while the upper end of the cable carries a pull ring 22, which is mounted within a well or depression 23 in the upper surface of ramp 3. By manually pulling upwardly on pull ring 22, lever 20 will be pivoted upwardly to thereby rotate cam 17. Rotation of the cam 17 will cause the lobe on the cam to move upwardly and thereby move rod 16 upwardly to open valve 15. This action will release the holddown 9 to enable the ramp to be pivoted upwardly through the influence of the counterbalancing spring assembly 4.

As disclosed in U.S. Pat. No. 4,922,568, cylinder 10 is mounted within an outer tube or housing 24, the upper end of which is pivotally connected to the underside of the ramp, and a coil spring 25 is located in the annular space between the tube 24 and cylinder 10. Spring 25 is interposed between the lower end of the tube 24 and a cap 26 which is secured to the upper end of the cylinder. As described in the aforementioned patent, spring 25 serves to accommodate upward float of the truck bed and ramp 3 during a loading operation.

The return-to-dock level mechanism of the invention includes an elongated arm 27 having its upper end pivotally connected to lugs 28 that depend from ramp 3. A link 29 is pivotally connected to the central portion of arm 27 at pivot 30 and the forward end of link 29 is pivotally connected to a lug 31 that is secured to the underside of lip 7 at pivot 32. Lug 31 can be provided with a plurality of holes, so that the location of the pivotal connection between link 29 and lip 7 can be varied to change the effective length of the link 29.

A lever arm 33 is secured to the opposite end of shaft 18 from lever 20 and as illustrated, the arm 33 normally projects generally vertically from shaft 18. A pin or abutment 34 projects laterally from arm 33 and is located in a plane where it can be engaged by arm 27, as shown in FIG. 3.

OPERATION

In the cross traffic position of the dockboard as shown in FIG. 1, lip 7 is in the pendant position and arm 27 extends downwardly and rearwardly from the ramp at an acute angle to the vertical.

To move the ramp to the upwardly inclined position, as shown in FIG. 4, the operator pulls upwardly on the pull ring 22 which releases the holddown mechanism 9 by pivoting the lever 20 upwardly to open valve 15. With the holddown mechanism released, the counterbalancing spring assembly 4 will pivot the ramp to the upwardly inclined position. At this time, the lip 7 is still in the pendant position and arm 27 is in the position shown in FIG. 4.

The operator then walks outwardly on the ramp 3 and the combined weight of the ramp and the operator will overcome the force of the spring assembly 4, thereby pivoting the ramp downwardly. As the ramp is walked downwardly, the lip lifting and latching mechanism, not shown, will pivot the lip outwardly to an extended position short of its fully extended position. Continued downward movement of the ramp will cause the lip to engage the bed of a truck or carrier 35 located in front of the dock, as seen in FIG. 2. Outward movement of the lip to the extended position will cause outward movement of link 29 and will pivot arm 27 forwardly. Engagement of the lip 7 with the truck bed 35 will move the lip to the fully extended position, thereby releasing the lip latching mechanism so that the lip is free to fall by gravity to the pendant position when the truck pulls away from the dock.

If the truck bed 35 is below-dock-level, as seen in FIG. 2, the mechanism of the invention will automatically move the ramp 3 upwardly to the horizontal cross traffic position when the truck pulls away from the dock, so that the cross traffic legs 36, which extend downwardly from the forward end of the ramp, can engage the supports 37 on the forward end of the frame 2 to hold the ramp in the horizontal cross traffic position.

In the below dock level position, as shown in FIG. 2, the distal end of arm 27 is located forwardly of abutment 34 on arm 33. As the truck pulls away from the dock, the lip pivots downwardly by gravity and link 29 is moved to the rear, thereby pivoting arm 27 rearwardly into engagement with abutment 34 and causing arm 33 to pivot rearwardly. Pivotal movement of arm 33 will move the lob of the cam 17 upwardly to lift the rod 16 and open the valve 15 in the holddown mechanism 9. This will permit the ramp to be elevated through the influence of the counterbalancing spring assembly 4. The mechanism is designed such that the distal end of the link will clear the abutment 34 when the ramp 3 is elevated to a position just slightly above horizontal. When the distal end of arm 27 clears the abutment 34, arm 33 will be returned to its original position, either by the weight of lever 20, or through a biasing spring, and this action will permit rod 16 to lower to close valve 15 and engage the holddown 9. The operator will then walk outwardly on the ramp, moving the ramp downwardly to the horizontal position where the cross traffic legs 36 engage the supports 37 to maintain the ramp in the horizontal position.

If, during the loading operation, the bed of the carrier 35 is located flush with the dock or above dock level, the distal end of arm 27 will be located above the abutment 34 so that as the lip 7 pivots back to its pendant position when the truck pulls away from the loading dock, the distal end of the link will not engage abutment 34 and there will be no release of the holddown. Thus, the return to dock level mechanism of the invention will only come into play when the ramp is at a below dock level position, as the lip falls to its pendant position.

The mechanism of the invention also enables end loads on the carrier bed 35 to be handled without hindering normal operation and without the necessity of disengaging any of the components. End loads are those loads or cargo which are located on the rear end of the truck bed and prevent the lip 7 from being extended into the truck bed. In normal operation, the end loads must be removed before the dockboard can be operated in a normal manner in which the lip is extended onto the truck bed. To remove end loads when the truck bed is below dock level, the operator will initially release the holddown 9 and permit the ramp 3 to pivot several inches to elevate the cross traffic legs 36 from supports 37 on the frame. The operator then retracts the cross traffic legs 36 through a conventional manual cable mechanism, not shown, and with the cross traffic legs retracted, the operator walks the ramp down to a downwardly inclined position to enable a fork lift truck to remove the end loads. With the end loads removed, the dockboard can be operated in the normal manner to remove the remaining cargo.

When using the above procedure to remove end loads, the distal end of arm 27 will at all times be behind abutment 34 on the arm 33, so that the arm 33 will not be engaged or pivoted by arm 27 during the end load removal procedure. Thus, the invention will not interfere with end load operation and will only come into play when the ramp is moved to its fully upwardly inclined position, as shown in FIG. 4.

While the drawings illustrate the abutment 34 being located on arm 33, it is contemplated that the construction can be reversed with the abutment extending laterally from the arm 27 and being engageable with arm 33.

The invention provides a smooth operating, inexpensive, effective mechanism for automatically returning the ramp of the dockboard having a hydraulic holddown from a below dock level position to a horizontal or cross traffic position.

Various modes of carrying out the invention are contemplated as being within the scope of the following claims particularly pointing out and distinctly claiming the subject matter which is regarded as the invention.

We claim:

1. A dockboard to be mounted on a loading dock comprising a supporting structure mounted on the dock, a ramp hinged at its rear end to the supporting structure, a lip hinged to the forward edge of the ramp and movable between a downwardly hanging pendant position and an outwardly extending position where the lip forms an extension to the ramp and is adapted to engage the bed of a carrier located adjacent the dock, ramp lifting means operably connected to the ramp for pivoting the ramp upwardly from a horizontal position to an upwardly inclined position, hydraulic holddown means operably interconnecting the ramp and the supporting structure for preventing upward movement of the ramp unless released but permitting free downward movement of the ramp, first manually operable means operably connected to said holddown means for manually releasing said holddown means to permit said ramp to pivot upwardly, second operating means responsive to movement of the lip from the extended position toward the pendant position when the carrier moves away from the dock and the ramp is in a below-dock-level position for releasing said holddown means to permit the ramp to be pivoted upwardly by said lifting means to a second position above dock level, and means operable as a consequence of the ramp being pivoted upwardly to said second position for deactivating said second operating means to thereby re-engage said holddown means and lock the ramp at said second position.

2. The dockboard of claim 1, wherein said first operating means comprises a flexible member having one end connected to said holddown means and the other end located on the upper surface of said ramp.

3. The dockboard of claim 1, wherein said second operating means comprises a rigid link having one end connected to said lip and extending to the rear of said ramp, an operating member having a first end pivotally connected to the ramp and having a central portion pivotally connected to the rear end of said link, and connecting means for interconnecting the second end of said operating member with said holddown means.

4. A dockboard to be mounted on a loading dock, comprising a frame, a ramp hinged at its rear end to the frame, a lip hinged to the forward edge of the ramp and movable between a downwardly hanging pendant position and an outwardly extending position where the lip forms an extension to the ramp and is adapted to engage a bed of a truck parked in front of said dock, counterbalancing means operably connected to the ramp for pivoting the ramp upwardly from a horizontal position to an upwardly inclined position, hydraulic holddown means operably interconnecting the ramp and the frame for preventing upward movement of said ramp unless released but permitting free downward movement of the ramp, said holddown means comprising a cylinder member to contain a hydraulic fluid, a piston slidable within cylinder member, a piston rod member connected to the piston and extending outwardly of the cylinder member, one of said members being pivotally connected to the ramp and the other of said members being pivotally connected to the frame, valve means associated with said piston, valve operating means connected to the valve means and extending outwardly of said cylinder member, and first actuating means responsive to movement of the lip from the extended position toward the pendant position when the truck pulls away from the dock and the ramp is in a below-dock-level position for actuating said valve operating means and opening said valve means to permit the ramp to be pivoted upwardly to a second position generally flush with dock level under the influence of said counterbalancing means.

5. The dockboard of claim 4, and including means responsive to upward movement of said ramp from said below-dock-level position to said second position for deactivating said actuating means and closing said valve means to thereby re-engage said holddown means.

6. The dockboard of claim 5, and including second actuating means connected to said valve operating means for manually actuating said valve operating means to open said valve means and permit the ramp to pivot upwardly under the influence of said counterbalancing spring means.

7. The dockboard of claim 4, wherein said actuating means comprises an arm pivotally connected to the ramp, connecting means interconnecting the arm and the lip, a pivotable member pivotally connected to the supporting structure and having a portion engaged with said valve operating means, said pivotable member and said arm being constructed and arranged such that movement of the lip from the extended position toward the pendant position when the ramp is at a below dock level position will pivot said pivotable member to thereby actuate said valve operating means and open said valve means.

8. The dockboard of claim 7, wherein said connecting means comprises a rigid link.

9. The dockboard of claim 7, wherein one of said arm and said pivotable member is provided with an abutment to be engaged by the other of said members when the arm is pivoted through movement of the lip from the extended toward the pendant position.

10. A dockboard to be mounted on a loading dock, comprising a frame, a ramp hinged at its rear end to the frame, a lip hinged to the forward edge of the ramp and movable between a downwardly hanging pendant position and an outwardly extending position where the lip forms an extension to the ramp and is adapted to engage a bed of a truck parked in front of said dock, counterbalancing means operably connected to the ramp for pivoting the ramp upwardly from a horizontal position to an upwardly inclined position, hydraulic holddown means operably interconnecting the ramp and the frame for preventing upward movement of said ramp unless released but permitting free downward movement of the ramp, said holddown means comprising a cylinder to contain a hydraulic fluid and pivotally connected to the ramp, a piston slidable in said cylinder, a piston rod connected to the piston and having an end projecting outwardly of the cylinder and connected to the frame, valve means associated with the piston, a valve operating rod slidably mounted in said piston rod and having a first end operably connected to said valve means, cam means operably connected to a second end of said rod, and means responsive to movement of the lip from the extended position toward the pendant position when the truck pulls away from the dock and the ramp is in a below-dock-level position for rotating said cam means in a first direction to thereby move said rod relative to said piston rod and open said valve means to permit the ramp to be pivoted upwardly to a second position generally flush with dock level under the influence of said counterbalancing means.

11. The dockboard of claim 10, and including manually operated actuating means connected to said cam means for manually rotating said cam means to move said rod and open said valve means.

12. The dockboard of claim 10, and including means responsive to upward movement of the ramp from said below-dock-level position to said second position for rotating said cam means in a second direction to thereby move said rod in a direction to close said valve means and engage said holddown.

* * * * *